United States Patent
Johnson et al.

(10) Patent No.: US 8,629,592 B2
(45) Date of Patent: Jan. 14, 2014

(54) HERMETIC SEALING ASSEMBLY AND ELECTRICAL DEVICE INCLUDING THE SAME

(75) Inventors: Curtis Alan Johnson, Niskayuna, NY (US); Myles Standish Peterson, II, Delanson, NY (US); Jeremy Daniel Vandam, West Coxsackie, NY (US); Timothy James Yosenick, Glenville, NY (US); Konrad Roman Weeber, Rexford, NY (US); John Russell Yagielski, Scotia, NY (US); Wayne Charles Hasz, Pownal, VT (US); Martin Mathew Morra, Glenville, NY (US)

(73) Assignee: General Electric Company, Niskayuna, NY (US)

( * ) Notice: Subject to any disclaimer, the term of this patent is extended or adjusted under 35 U.S.C. 154(b) by 592 days.

(21) Appl. No.: 12/491,326

(22) Filed: Jun. 25, 2009

(65) Prior Publication Data

US 2010/0327537 A1 Dec. 30, 2010

(51) Int. Cl.
*H02K 5/10* (2006.01)
*H02K 5/12* (2006.01)
*F16J 15/02* (2006.01)

(52) U.S. Cl.
USPC ............ 310/88; 310/85; 310/86; 277/630; 277/637

(58) Field of Classification Search
USPC .............................. 310/85–88; 277/630, 637
IPC .................................................. H02K 5/12,5/10
See application file for complete search history.

(56) References Cited

U.S. PATENT DOCUMENTS

| | | | | |
|---|---|---|---|---|
| 3,347,168 A | * | 10/1967 | Nixon | 417/350 |
| 4,451,749 A | * | 5/1984 | Kanayama et al. | 310/62 |
| 4,541,786 A | | 9/1985 | McLean | |
| 4,606,111 A | * | 8/1986 | Okazaki et al. | 29/463 |
| 4,652,218 A | | 3/1987 | Tsutsui et al. | |
| 4,877,985 A | | 10/1989 | Byrd et al. | |
| 4,946,304 A | * | 8/1990 | Scharbach | 403/272 |
| 5,864,198 A | * | 1/1999 | Pinkerton | 310/266 |
| 6,069,421 A | | 5/2000 | Smith et al. | |
| 6,307,290 B1 | * | 10/2001 | Scarsdale | 310/87 |
| 6,893,230 B2 | | 5/2005 | Sung et al. | |
| 7,312,559 B2 | | 12/2007 | Lee et al. | |

(Continued)

FOREIGN PATENT DOCUMENTS

| | | |
|---|---|---|
| CN | 101083405 A | 12/2007 |
| CN | 201038872 Y | 3/2008 |

(Continued)

OTHER PUBLICATIONS

European Search Report dated Nov. 10, 2010.

(Continued)

*Primary Examiner* — Terrance Kenerly
(74) *Attorney, Agent, or Firm* — Paul J. DiConza

(57) ABSTRACT

Disclosed herein is a system including a motor comprising a rotor, a stator and a sealing assembly having at least one joint and a monolithic ceramic separator. Each joint of the sealing assembly is a chemical bond joint, and the monolithic ceramic separator is disposed in a gap between the rotor and the stator of the motor such that the sealing assembly hermetically isolates the rotor and the stator.

39 Claims, 5 Drawing Sheets

(56) References Cited

U.S. PATENT DOCUMENTS

| | | |
|---|---|---|
| 7,337,526 B2 | 3/2008 | Sweo |
| 7,579,724 B2 | 8/2009 | Kaminski et al. |
| 2005/0120719 A1 | 6/2005 | Olsen |
| 2007/0200443 A1* | 8/2007 | Baudelocque et al. ...... 310/90.5 |
| 2007/0236094 A1* | 10/2007 | Kaminski et al. ........ 310/156.28 |
| 2007/0278879 A1* | 12/2007 | Kaminski et al. ............... 310/86 |
| 2008/0231132 A1* | 9/2008 | Minowa et al. ............... 310/114 |
| 2010/0060006 A1* | 3/2010 | Ichimaru et al. ................ 290/52 |
| 2010/0295396 A1* | 11/2010 | Bode et al. ...................... 310/86 |
| 2011/0058966 A1* | 3/2011 | Cunningham et al. ..... 417/410.1 |

FOREIGN PATENT DOCUMENTS

| | | |
|---|---|---|
| EP | 1863152 A2 | 12/2007 |
| GB | 1437532 A | 5/1976 |
| WO | 2004036052 A1 | 4/2004 |
| WO | WO2009137316 A1 | 11/2009 |

OTHER PUBLICATIONS

Unofficial English translation of Office Action issued in connection with corresponding CN Application No. 201010221468.5 on Oct. 28, 2013.

* cited by examiner

HERMETIC SEALING ASSEMBLY AND ELECTRICAL DEVICE INCLUDING THE SAME

BACKGROUND

The invention relates generally to an electric device with rotor and stator and particularly to an electrical device including a sealing assembly protecting the stator from corrosive environments.

Industrial electric devices, such as motors, often include a stationary portion, or stator, and a rotating portion, or rotor. Typically, the rotor and the stator are configured to produce opposing magnetic fields, thereby generating rotational motion in the rotor that is used to perform mechanical work. In the oil and gas industry, the rotor and stator assemblies can operate in a process gas, which can also serve as a cooling agent. The process gas typically is natural gas at pressures of about 10 bar to about 200 bar. Unfortunately, natural gas can have a high degree of contaminants. These contaminants can include corrosive agents such as hydrogen sulfide ($H_2S$), water, $CO_2$, oil, and others. In particularly aggressive conditions, the combination of water and $H_2S$ leads to more corrosive gases such as what is called wet sour gas or at higher concentrations, acid gas. The presence of a process gas environment that contains the above contaminants poses a significant risk to the vulnerable components of the stator assembly.

Typically a gap separates the stator assembly from the rotor assembly. In order to maximize the magnetic field strength between the stator and rotor assembly, this gap is made as small as possible while still meeting mechanical clearance requirements between the rotor shaft and the stator. Current stators are either encapsulated or non-encapsulated. In the case of encapsulated stators, the stator encapsulation protects the stator components from the process environment of the rotor assembly.

The stator encapsulators generally need to withstand the large pressure differentials, large temperature gradients, and mechanical vibrations during operation. In harsh operating environments, the sections of the encapsulator located in the gap between the stator and the rotor shaft should minimize leakage of corrosive process gases, should resist corrosion in the harsh process gas environment, should be readily joinable to other sections of the encapsulator, and should minimize eddy current losses to reduce overall electrical losses in the machine.

Therefore, there is a need for providing a compatible, low loss material and processes for assembling the same for stator encapsulation.

BRIEF DESCRIPTION

One embodiment of the present invention is a system with a motor. The motor comprises a rotor, a stator and a sealing assembly having at least one joint and a monolithic ceramic separator. Each joint of the sealing assembly is a chemically bonded joint, and the monolithic ceramic separator is disposed in a gap between the rotor and the stator of the motor such that the sealing assembly hermetically isolates the rotor and the stator.

Another embodiment of the present invention is a motor. The motor comprises a rotor, a stator and a hermetic sealing assembly comprising a monolithic ceramic separator disposed in a gap between the rotor and the stator. The monolithic ceramic separator used herein is mechanically isolated from the stator and comprises a plurality of ceramic sections joined by at least one section joint. Each of the section joints of the monolithic ceramic separator is essentially a chemical bond joint.

Yet another embodiment of the present invention is a motor. The motor comprises a rotor, a stator and a hermetic sealing assembly comprising a monolithic ceramic separator and end regions such that the monolithic ceramic separator and the end regions are hermetically joined by an adapter flange. The adapter flange is joined to the monolithic ceramic separator and the end regions by means of chemical bond joints.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
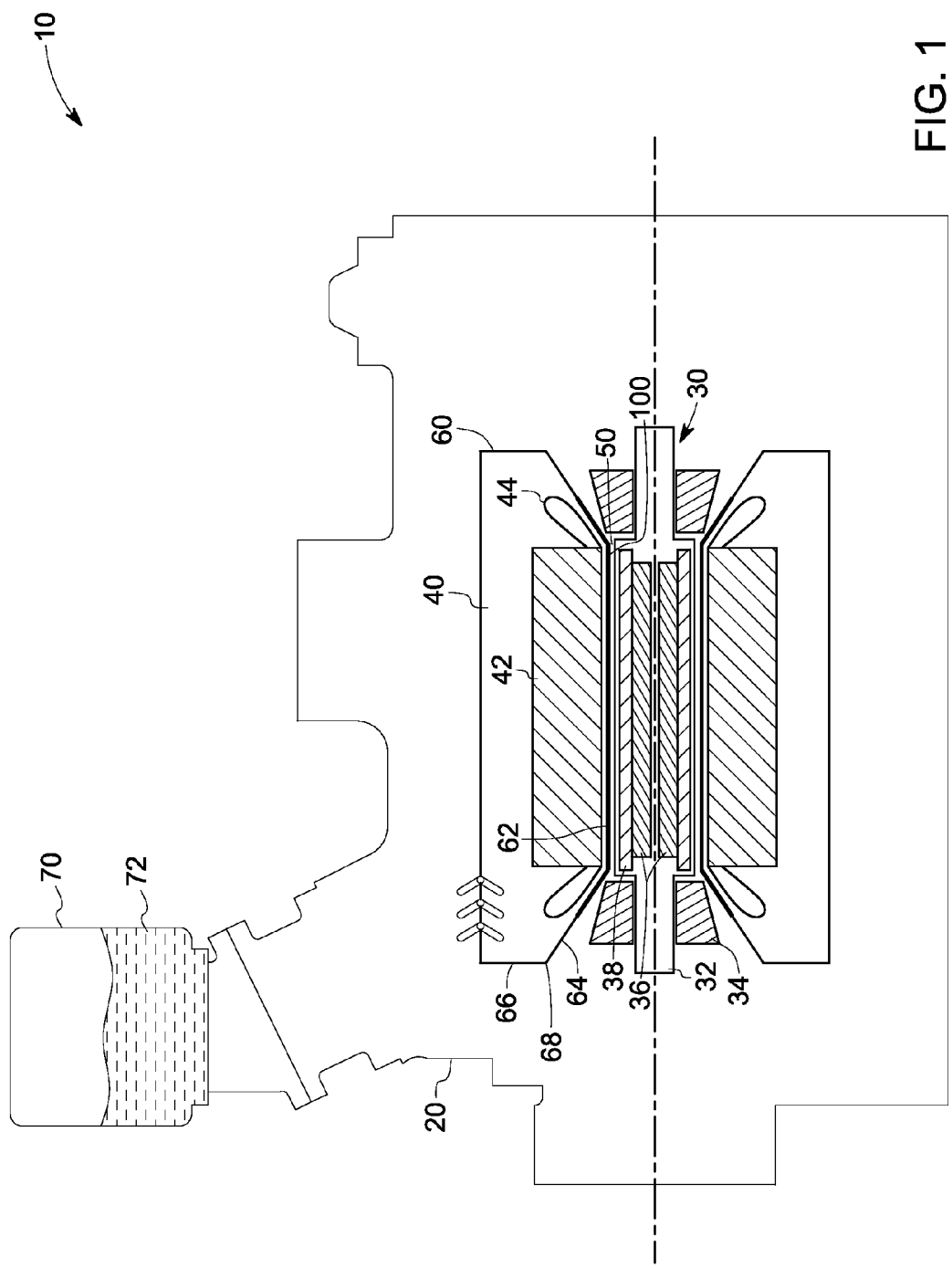
FIG. 1 is a diagrammatical cross-sectional representation of a system with an electric motor with a rotor and stator assembly, in accordance with one embodiment of the present invention.

Embodiments of the present invention include protective hermetic sealing assemblies for a stator from the processing gases of the rotor in a motor of a system, and associated materials, structures and methods to manufacture the hermetic sealing assembly.

In the following specification and the claims that follow, the singular forms "a", "an" and "the" include plural referents unless the context clearly dictates otherwise.

Various embodiments of the present invention describe use of a sealing assembly within an electric motor. The sealing assembly comprises a monolithic ceramic separator disposed in a gap between the rotor and the stator, and at least one joint such that the sealing assembly hermetically isolates the rotor and the stator. Each joint of the sealing assembly, whether used to join components of the sealing assembly together or used to join the sealing assembly to the rest of the motor, is a chemical bond joint. As used herein a "chemical bond joint" is a joint that applies chemical or metallic bonding (such as a joint made by brazing two components together, or by joining the components by fusing and solidifying a glass at the joint) and is essentially free of any mechanical seals. "Free of mechanical seals" essentially means that each joint of sealing assembly is free of mechanical sealing components such as O-rings or gaskets. Hence the chemical bond joints of the sealing assembly do not use any polymeric or metallic O-rings or seals commonly used in ultra-high vacuum applications.

As used herein and through out the rest of the specification, the term "hermetic" means the capability of limiting a helium gas leak to a rate lower than $1 \times 10^{-8}$ std cm$^3$/sec. Limiting the leak rate to this low number during the long life-terms of the sealing assemblies is not currently well exploited in the art. Further, many of the current applications employing the sealing assemblies use O-rings for sealing. Currently known O-rings typically comprise materials, such as organic materials, which are known to degrade in the harsh environments that may include high temperatures, pressures, and/or in the presence of corrosive gases. Either because of the degradation, or by the inherent properties of the materials, the O-rings or the metallic seals tend to be permeable to certain gases and species over a period of time. For instance, many organic materials can degrade and become brittle over long-term usage in these environments and therefore which may lead to gas leaks across the sealing. The present invention overcomes this deficiency by not using any kind of O-rings or gaskets of any organic or metallic materials for sealing.

By materials and design selection, the monolithic ceramic separator is also fabricated to have minimal eddy current and electric losses, and therefore does not negatively impact the performance of the motor in a substantial way. Also, the chemical inertness of the ceramic materials used protects the stator from the harsh chemical environments such as $H_2S$ that the rotor is exposed to. The possibility of using a ceramic encapsulator section with joined parts also allows application of embodiments described herein to larger electric motors. Thus, embodiments of the present invention allow the use of a non-magnetic barrier within a large electric machine, wherein the barrier does not contribute to substantial electrical losses.

Referring now to the drawings, FIG. 1 shows an exemplary system 10 that includes a motor 20 with a rotor assembly (also referred to herein as "rotor") 30 and stator assembly (also referred to herein as "stator") 40. The rotor 30 includes rotor shaft 32 supported in this example by bearings 34 (such as magnetic bearings), and permanent magnets 36 with magnet enclosures 38, aligned with and disposed in magnetic communication with stator assembly 40. In an exemplary embodiment the stator assembly 40 surrounds the rotor assembly 30, and includes stator core 42 and stator windings 44 arranged to provide a magnetic field when electrical current flows through windings 44. A gap 50 separates the rotor assembly 30 from the stator assembly 40. The gap 50 can be evacuated, can be an air gap or can comprise any fluids including a process gas.

When appropriately energized, the stator assembly 40 is effective to attract the rotor assembly 30 so as to provide levitation and radial placement of the rotor shaft 32. The illustrated system 10 further includes an encapsulation 60 of the stator assembly 40. The stator encapsulation 60 protects the stator 40 from the corrosive process gas environment. In one exemplary embodiment, the stator encapsulator 60 is formed from multiple sections such as 62, 64, and 66 that are joined at various interfaces such as 68.

Figure 2:
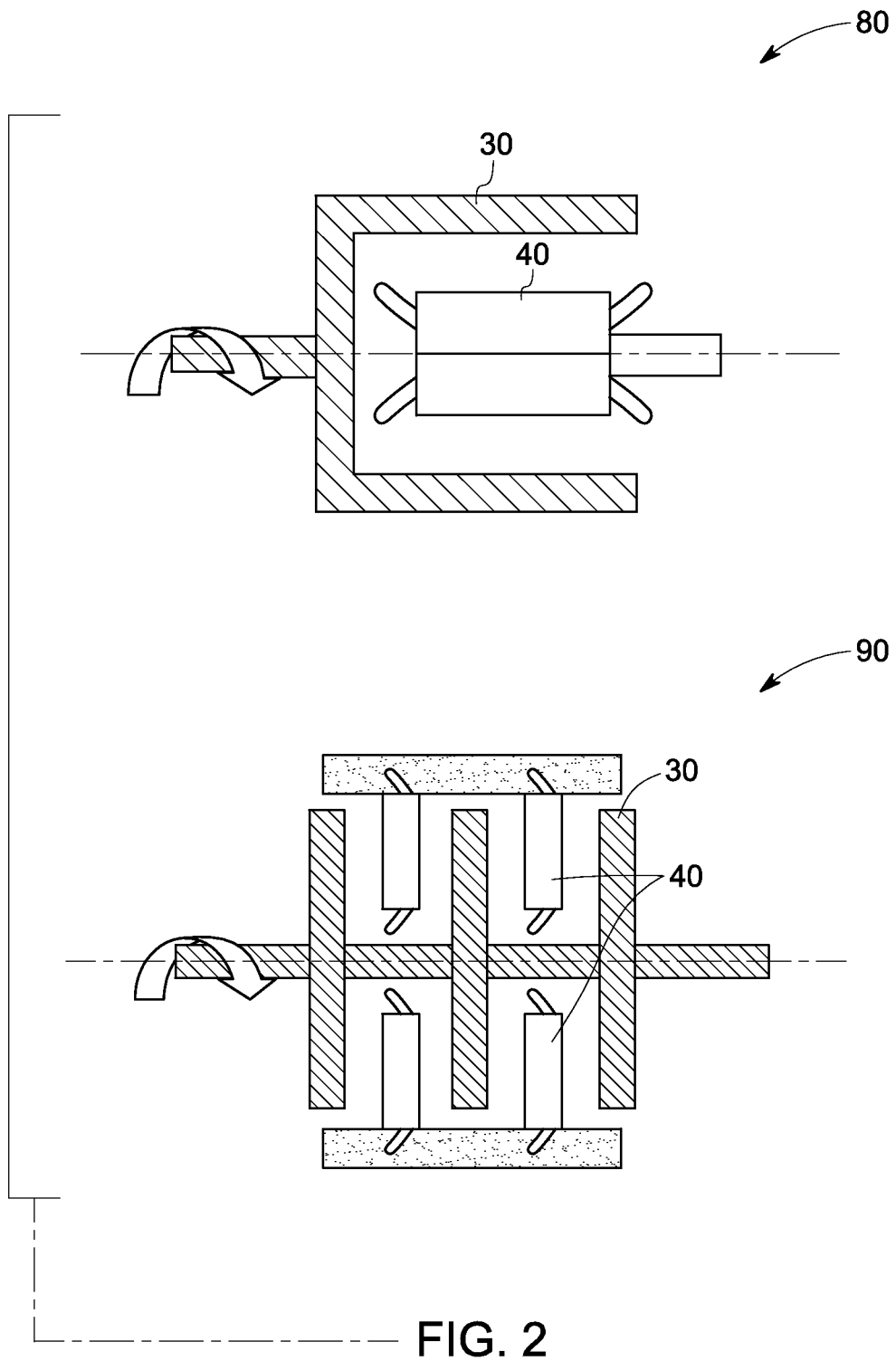
FIG. 2 is a diagrammatical cross-sectional representation of different relative positions of stator with respect to rotor.

While FIG. 1 depicts one embodiment of the stator and rotor arrangement, wherein stator 40 surrounds the rotor 30, alternative arrangements for the stator and rotor are depicted in FIG. 2, for example. In one embodiment, the rotor 30 is positioned around the stator 40 and rotates in the magnetic field of the stator as depicted in the arrangement 80, and in another exemplary embodiment, the stator 40 and rotor 30 can be axially positioned as depicted in arrangement 90.

Figure 3:
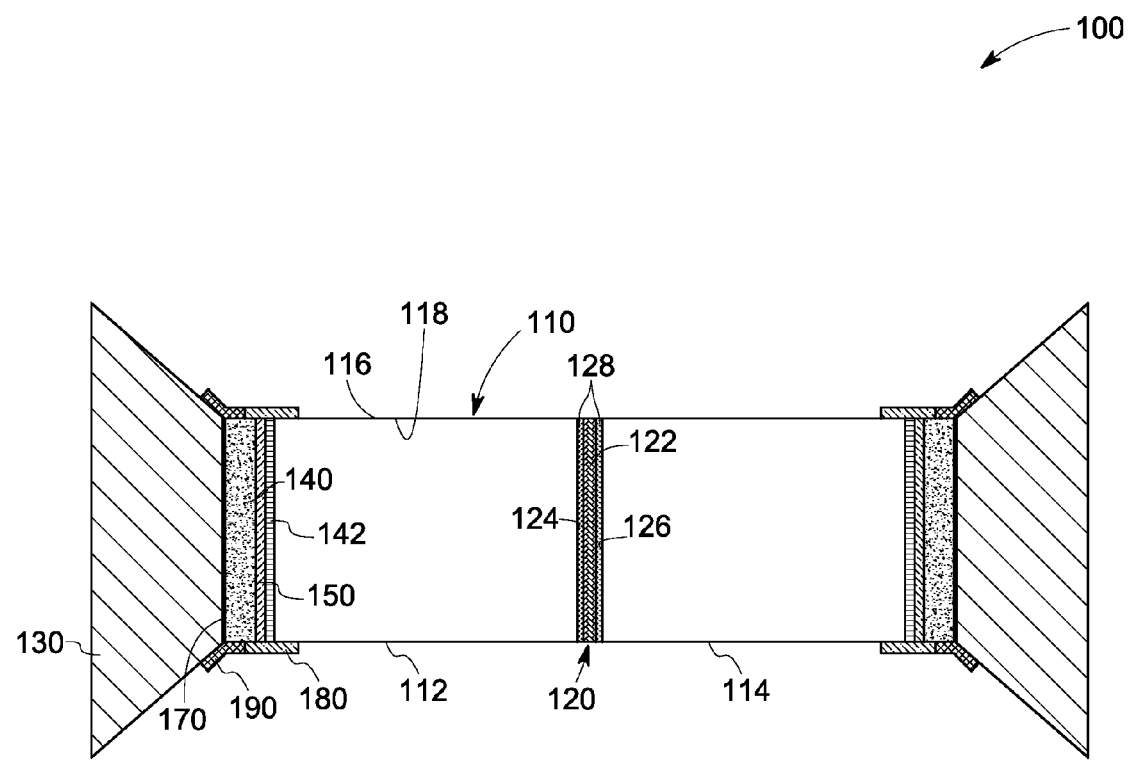
FIG. 3 is a schematic representation of a monolithic ceramic separator with the end regions in one embodiment of the present invention.

In one embodiment of the present invention, the stator encapsulator 60 includes a sealing assembly 100. The sealing assembly 100 includes the stator encapsulator sections 62 and 64 (FIG. 1). FIG. 3 separately depicts the sealing assembly 100 including a monolithic ceramic separator 110. The sealing assembly 100 used herein is substantially inert to an environment comprising a process fluid such as untreated oil, high salinity aqueous materials, harsh environment gas including $H_2S$, an acid gas, or a well gas. The monolithic ceramic separator 110 is a ceramic component disposed between the rotor 30 and the stator 40 in the gap 50. While the word monolithic is used, this does not necessarily denote that the ceramic separator is essentially of a single piece; rather, the term is used herein to distinguish the material used in the separator from organic based composite materials. As used herein and in the rest of the specification, the term "monolithic ceramic separator" refers to a substantially undifferentiated rigid whole structure made of one or more pieces. In a non-limiting example, the monolithic ceramic separator 110 is prepared by hermetically joining two or more ceramic sections such as 112 and 114 together by section joints essentially comprising chemical bond joints. The density of the ceramic material used to form the separator 110 is selected such that the ceramic itself is hermetic. In one embodiment, the ceramic sections of the monolithic ceramic separator 110 are substantially dense with the density value exceeding about 98% of theoretical density. However, those skilled in the art appreciate that many ceramics can be made hermetic at significantly lower densities, for example, about 90% of its theoretical density; thus in some embodiments the density of the ceramic sections is at least about 90% of theoretical density.

Embodiments of the present invention provide the capability of hermetically joining two or more ceramic sections, and therefore provide a manufacturable method to seal the stator 40 from the process gases even in large and high speed electric motors, without significant losses by corrosion in harsh process environments. In one embodiment, the monolithic ceramic separator 110 can further have a coating disposed on the inner or outer surfaces (not shown). The coating can comprise any material such as a corrosion or errosion resistant metal, an alloy, a ceramic or a composite so as to increase the performance and life of the monolithic ceramic tube.

While different geometrical forms for the monolithic ceramic separator 110 fall within the scope of this invention, in one embodiment the monolithic ceramic separator 110 is in cylindrical form. The materials and section joint design of the monolithic ceramic separator 110 are chosen so that the materials will produce minimal eddy current and/or other electric losses in the magnetic filed of rotor and stator, and therefore does not negatively impact the performance of the motor 20. Also, the chemical inertness of the materials used protects the stator from the harsh chemical environments that it is exposed to. For example, the electrical losses incurred by using a monolithic ceramic separator 110 constructed using an alumina material with about 10 mm thickness is negligible during operation of the motor 20.

In one embodiment the sealing assembly 100 hermetically isolates the rotor 30 and stator 40 assemblies (FIG. 1). In another exemplary embodiment the monolithic ceramic separator 110 is mechanically isolated from the stator. As used herein the term "mechanically isolated" means that the stator 40 does not directly support the monolithic ceramic separator 110 and therefore most of the mechanical vibrations of the stator parts are not passed on to the monolithic ceramic separator 110. In one embodiment, the monolithic ceramic separator 110 can find its support from the other regions of the sealing assembly 100. Optionally, vibration and abrasion resistant plastic blocks can be positioned between the monolithic ceramic separator 110 and the stator 40 so as to help the initial alignment during assembly.

The monolithic ceramic separator 110 in FIG. 3 comprises two surfaces. A first surface 116 is proximate to the stator 40 and a second surface 118 is proximate to the rotor 30. In the absence of direct support from the stator, one strategy to maintain the mechanical integrity and to increase the useful life of the monolithic ceramic separator 110 is to apply a pressure compensation system 70 (FIG. 1) to minimize the difference between the pressures acting on the first surface 116 and that acting on the second surface 118 of the monolithic ceramic separator 110. The pressure compensator system 70 can be a diaphragm, a bellows, a volume exchange system, or any other type of pressure balancer. The pressure compensator 70 helps in balancing the pressures exerted on the stator encapsulator 60 through the disbursement of a hydraulic fluid 72. The hydraulic fluids are the medium by which the pressure can be transferred and can be composed of any gases or liquids including air, water, process gas, oils, or polymers.

One example of a pressure compensation system is a large bellows holding a hydraulic fluid 72, which can dispose a required amount of hydraulic fluid 72 to control the difference between pressure acting on the first surface 116 (FIG. 3) and pressure acting on the second surface 118. The hydraulic fluid 72 can contact the monolithic ceramic separator 110 in the first surface 116 or the second surface 118, depending on the configuration of the motor. For example, during an operation of the motor 20 in a gaseous atmosphere, there is a possibility of having a process gas in the vicinity of rotor 30. In one embodiment the process gas can exert pressure on the surface 118 of the monolithic ceramic separator 110, which is balanced by the hydraulic fluid 72 disposed near the opposite surface 116. In an exemplary embodiment oil is disposed as a hydraulic fluid at the surface 116 of the monolithic ceramic separator 110.

The monolithic ceramic separator 110 may comprise any ceramic materials including glasses and crystalline or amorphous oxides, nitrides, and carbides. Non-limiting examples of the materials of monolithic ceramic separator include zirconium oxide, silicon carbide, silicon nitride, alumina, mullite, titanium nitride, rutile, anatase, boron carbide, boron nitride, beryllium oxide, silica, silica-based glasses, or any combination including any of these materials.

As discussed in earlier sections, the monolithic ceramic separator 110 can, in certain embodiments, comprise section joints, such as joint 120, between a plurality of ceramic sections such as, for example sections 112 and 114. In one embodiment, at least one of the section joints 120 between the ceramic sections comprises a diffusion bond. Diffusion bonding is a joining process wherein the principal mechanism is interdiffusion of atoms across the interface. The diffusion bond can be formed by the diffusion between ceramic faces, or metallized ceramic faces. Alternately the section joint 120 can be formed by using a glassy material, such as those materials known in the art as "frits," in between the ceramic sections to obtain a glass seal. The glassy materials or glass frits are selected for chemical compatibility with the ceramic sections and the manufacturability of the monolithic ceramic separator 110 by joining the sections 112 and 114. Non-limiting examples of the glassy materials, which can be used include silicon oxide, boron oxide, bismuth oxide, lead oxide, calcium oxide, sodium oxide, potassium oxide or any combinations including any of these materials.

In another embodiment, at least one of the section joints 120 between the ceramic sections 112 and 114 is a brazed joint, and thus the joint 120 comprises a braze material 122. The braze material can include one or more materials such as gold, copper, silver, platinum, palladium, nickel, titanium, vanadium, zirconium, beryllium, or any alloy including any of these materials. In certain embodiments, the braze material is a so-called "active braze" material, which contain constituents such as titanium, vanadium, nickel, or other elements that promote wetting on a ceramic surface. The braze material 122, comprising a metallic part in the joint 120 in the electrically impacted zone, is disposed to be sufficiently thin so as not to have a negative performance impact. In some embodiments, respective joining surfaces 124 and 126 of sections 112 and 114 comprise a metallic coating to aid in the wetting of the braze material onto sections 112 and 114, thereby providing an improved joint. In one embodiment, the metallic coating 128 can include molybdenum, manganese, or a molybdenum-manganese metallization layer that can be bonded to the ceramic. The metallization layer can further be plated with a nickel layer. While different methods can be envisaged to join the ceramic sections such as 112 and 114, in one particular embodiment, a brazing method is utilized for joining different ceramic sections.

The hermetic sealing assembly 100 (FIG. 3) can further comprise end regions 130 joined hermetically to the monolithic ceramic separator 110. The end regions 130 can comprise a ceramic material, a metallic material, or a cermet. In one particular embodiment, the end region comprises an alloy 625. In one embodiment, at least one of the end regions 130 is joined hermetically to the monolithic ceramic separator 110 through an adapter flange 140. Adapter flange 140, in an exemplary embodiment, is made of a metal or alloy. In certain embodiments, adapter flange 140 can comprise elements such as gold, nickel, titanium, silver, copper, platinum, palladium, niobium, tantalum, molybdenum, alloy 625, zirconium, cobalt, chromium, stainless steel, or any combinations of these materials. In an exemplary embodiment, the adapter flange 140 comprises a nickel-based super alloy. In some embodiments, the adapter flange comprises niobium. In one embodiment, the adapter flange 140 is made of niobium-based alloy and in yet another embodiment the adapter flange 140 is made of a commercially pure niobium.

Figure 6:
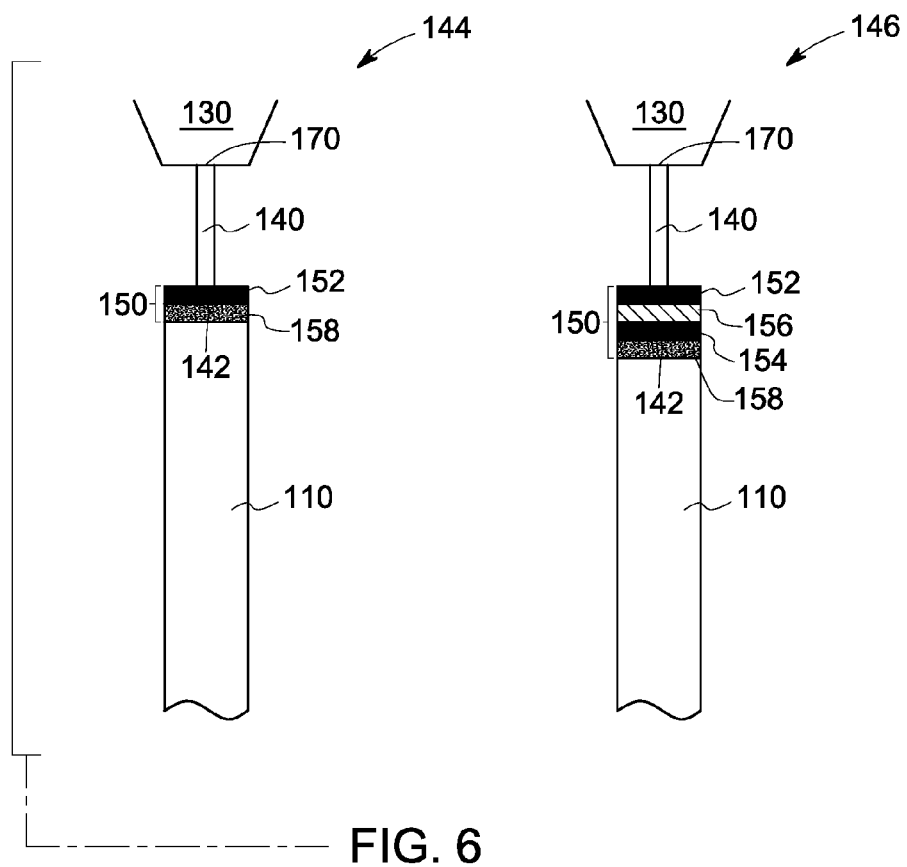
FIG. 6 is a schematic cross-sectional representation of a braze joint between the metallic flange and the monolithic ceramic separator in one embodiment of the present invention.

The adapter flange can be hermetically joined to the monolithic ceramic separator 110 or end regions 130 by different means. In one embodiment, the adapter flange 140 is joined to the monolithic ceramic separator 110 at its joining surface 142 through a chemically bonded flange joint. In another embodiment, the flange joint is essentially a braze joint 150, which is depicted in detail in FIG. 6 and discussed further, below. The possibility of hermetically joining the monolithic ceramic separator 110 to the adapter flange 140 allows the monolithic ceramic separator to be positioned in the motor 20 during assembly, independent of the large end regions 130. The adapter flange 140 can then be subsequently joined to the large end regions 130 forming a hermetic seal using a known joining method.

Figure 4:
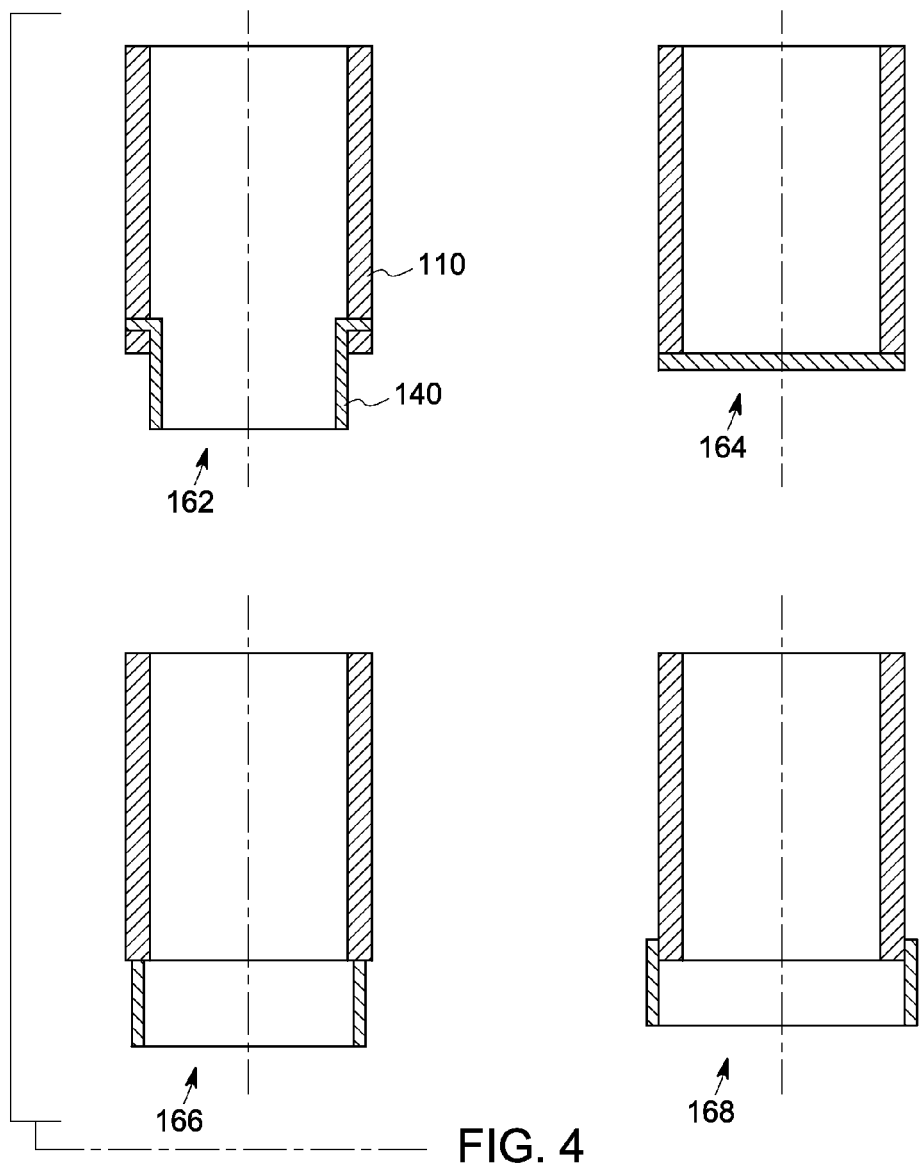
FIG. 4 is a diagrammatical representation of different joints of metallic flange with respect to the monolithic ceramic separator in various embodiments of the present invention.

FIG. 4 schematically represents some of the many possible joints between the monolithic ceramic separator 110 and a metallic adapter flange 140 such as a sandwich joint (162), a cap joint (164), a butt joint (166), and a lap joint (168). In an exemplary embodiment the monolithic ceramic separator 110 is joined to the metallic adapter flange 140 through a sandwich joint (162). In another exemplary embodiment, the monolithic ceramic separator 110 is joined to the metallic adapter flange 140 through a butt joint (166). In another embodiment, the joint used is a combination of two or more types of these joints.

Figure 5:
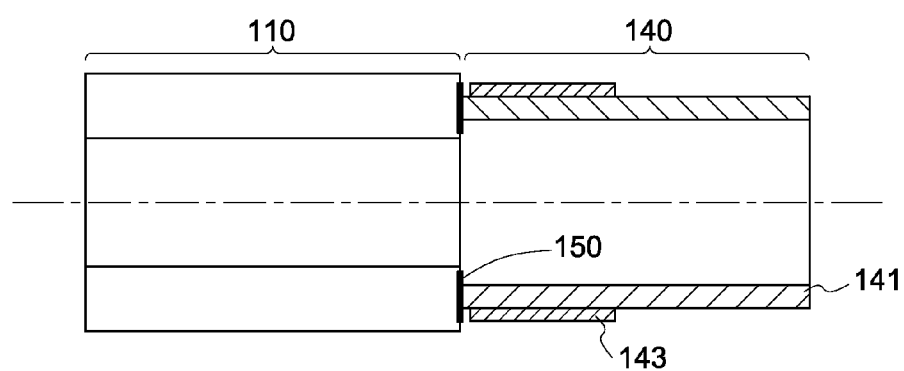
FIG. 5 is a schematic cross-sectional representation of a braze joint between the metallic flange and the monolithic ceramic separator in one embodiment of the present invention.

The adapter flange 140 can have any compatible shape and size for hermetically joining the end regions 130 to the monolithic ceramic separator 110. In one embodiment, the adapter flange has cylindrical shape. In another exemplary embodiment, the adapter flange 140 comprises a combination of two or more sections comprising similar or dissimilar metals or alloys. For example, in one embodiment, the adapter flange 140 has a combination of two concentric cylinders as depicted in the schematic cross sectional representation in FIG. 5 and joined to the monolithic ceramic separator 110 through a braze joint 150, for example, a butt joint (166) as shown in FIG. 4. The combination of inner 141 and outer 143 sections helps to achieve corrosion resistance to the process gases and also controlled thermal expansion rate compatible to the monolithic ceramic separator 110. In the present example, inner section 141 provides hermetic joint to the ceramic tube, carries the mechanical loads imposed by the operation of the system, and resists corrosion while exposed to the process gases. One example of the material that can be used as the inner section 141 of the adapter flange 140 is alloy 625. The outer section 143 helps to constrain the thermal expansion of the inner section 141 during the brazing process. The material for the outer section 143 can be selected so as to have a low thermal expansion coefficient and a high elastic modulus at elevated temperatures, thereby providing a combination adapter flange 140 can be produced such that the effective thermal expansion rate of the adapter flange 140 matches the thermal expansion coefficient of the monolithic ceramic separator 110. Molybdenum is used as the outer section 143 material in the present example. The outer section 143 can be joined to the inner cylinder by different bonding techniques such as diffusion bonding, inertia welding, or brazing. Alternatively the outer section 143 can be formed directly on the surface of the inner section 141 by means of different methods such as cladding, plating, deposition, casting, mechanical attachment or thermal spray.

As discussed above, FIG. 6 represents a braze joint 150 between the joining face 142 of the monolithic ceramic separator 110 and an adapter flange 140. In one embodiment, the braze joint 150 includes a braze material 152 as shown in the arrangement 144. In certain designs of the braze joint 150, a further metallization layer is applied on the adapter flange (not shown). In another embodiment, the braze joint 150 includes the braze materials 152, 154 and a metallic interlayer 156 as shown in the arrangement 146. A metallic interlayer, in certain situations, can help to accommodate the mechanical strains present in the ceramic sections. The braze materials 152 and 154 can be of identical materials or different. Generally the braze joint 150, and the braze materials 152, 154 are designed from materials which are capable of operating in harsh environments. The braze materials 152, 154 can include elements such as gold, copper, silver, platinum, palladium, nickel, titanium, vanadium, zirconium, beryllium, or any alloy including any of these materials. The metallic interlayer 156 can include gold, silver, copper, nickel, lead, titanium, niobium, platinum, tantalum, chromium, or any alloy including any of these materials. The metallic interlayer can be introduced to the braze joint 150 in different forms including a film or powders. In one exemplary embodiment, metallic powders are introduced in between the braze materials 152 and 154 and hot isostatically pressed to form the metallic interlayer 156.

Another requirement of a braze joint 150 is to be compliant to accommodate the rigidity of the monolithic ceramic separator 110. This compliance can be achieved through the proper design of the adapter flange 140 and the braze joint 150. Accordingly, in one embodiment, the adapter flange 140 has a compliant shape, such as a bellows joint. Further, the adapter flange 140 can be designed to have any required load capacity and to have the ability to handle differential thermal expansion of the monolithic ceramic separator 110 and the end regions 130. In certain embodiments, the braze joint 150 is formed on the monolithic ceramic separator 110 before the assembly of the stator 40 and in some other embodiments, the braze joint 150 can be formed during the assembly of stator 40.

The braze joint 150 between the monolithic ceramic separator 110 and adapter flange 140 at a joining surface 142 of the monolithic ceramic separator 110 can further comprise a metallization layer 158, facilitating the joining with the adapter flange 140. This metallization layer 158 can comprise molybdenum, molybdenum-maganese, nickel, tungsten, chromium, titanium, copper, boron, niobium, alloy 625, or combinations of any of these materials. In one embodiment, the metallization layer further comprises a wetting layer to enhance the joining compatibility with the monolithic ceramic separator 110. A non-limiting example of this wetting layer is a layer comprising nickel.

The adapter flange 140 can be hermetically joined to the end regions 130 by a chemically bonded end region joint 170 selected from various joints such as a direct joint, welded joint, a diffusion bond, a brazed joint, a sintered bond, a cast bond, or any combinations of these joints. In an embodiment wherein the adapter flange is joined to the end region by a direct joint, the adapter flange is joined to the end region directly by sintering, hot isostatic pressing (HIP), flame spraying, or otherwise depositing the adapter material directly to the end region. In one exemplary embodiment, the joint 170 comprises a welded joint.

Figure 7:
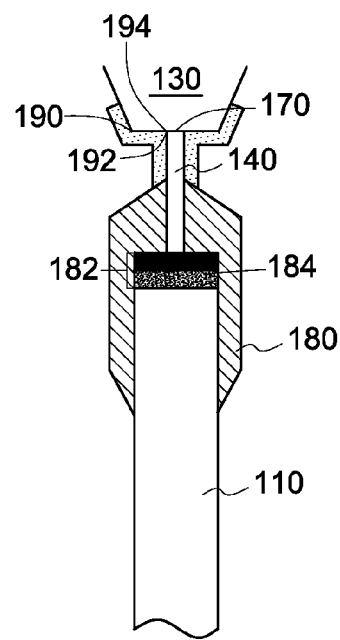
FIG. 7 is a schematic representation of metallization of the monolithic ceramic separator in one embodiment of the present invention.

The flange joint 150 between the monolithic ceramic separator 110 and adapter flange 140 and the end region joint 170 between the end region 130 and the adapter flange 140 can be further protected by applying protective coatings 180 and 190 respectively as shown in FIG. 7. The protective coatings 180 and 190 may protect the joints 150 and 170 from degradation, such as by erosion and corrosion. One example of degradation is galvanic corrosion, normally formed at the joints of dissimilar materials. The protective coatings 180 and 190 can be disposed on the outer surfaces 182 and 192 or inner surfaces 184 and 194 of the joints 150 and 170 respectively. In one embodiment, the protective coatings 180 and 190 are disposed on both the outside surfaces 182 and 192 and inside surface 184 and 194 of the joints 150 and 170 respectively. In one embodiment, the protective coating 180 covers the surfaces of joining end of the adapter flange, any metallization layers 158, braze layers 152, 154, and metallic interlayers 156 present and the joining end 142 of the monolithic ceramic separator 110. In another embodiment, the metallization layer 158 disposed on the joining face 142 of the monolithic ceramic separator extends over the surface of the joining end of the monolithic ceramic separator 110 and the separate protective coating 180 covers the rest of the braze joint 150 surfaces.

The protective coatings 180 and 190 can be made of single layers or of multiple layers and can comprise any materials such as metals, ceramics, glass, polymers, or any combinations of these materials. The protective coatings 180 and 190 can be of same materials or made of different materials depending on their functions. The protective coating compositions are selected to be matched to either or both the compositions present around a joint 150 or 170. In one embodiment, at least one layer of the protective coating 180 comprises a refractory metal. Examples of refractory metals include niobium, tantalum, zirconium. In another embodiment, the protective coating 180 comprises a refractory material such as tungsten carbide or silicon carbide. In another embodiment, the protective coating 180 comprises the combinations of various elements such as Co, Cr, or Al. In one more embodiment, the protective coating 190 includes a metal or a ceramic. In an exemplary embodiment, the protective coating comprises an oxide of a metal.

The protective coatings 180 and 190 can be applied to the surfaces 182, 184, 192, and 194 of the joints 150 and 170 respectively by any coating method including chemical vapor deposition (CVD), physical vapor deposition (PVD), thermal spray, sol-gel deposition, electron beam deposition, electroplating, ion-plating, or any combination of these. In one particular embodiment, at least one of the protective coatings 180 or 190 is formed by the oxidation of the elements present in the joint 150 or 170 region.

The system 10 comprising the motor 20 with the rotor 30, stator 40 and the sealing assembly 100 described in the above embodiments can be used in different applications, including the places where harsh and adverse environments are present. The applications of these systems include in the oil and gas industry, submarine operations, to list a few.

EXAMPLES

The following example illustrates embodiments in accordance with the invention, and as such should not be construed as imposing limitations upon the claims.

Two cylindrical sections 112 and 114 (FIG. 3) with about 3 feet length, 1 foot outer diameter and about 10 mm thickness were prepared to about 99% of the theoretical density using alumina material. The two sections 112 and 114 were hermetically joined together using a brazed section joint to form the monolithic ceramic separator 110. The ceramic ends to be joined together were coated with a molybdenum manganese layer, using nickel as a wetting layer, and were joined with a braze. The other, free ends of the ceramic sections 112 and 114 were also metallized with molybdenum-manganese layer using nickel as the wetting layer. An adapter flange 140 of niobium was joined at both the metalized ends by using a gold braze. The monolithic ceramic separator 110 along with the adapter flange 140 was assembled in between the rotor 30 and stator 40 of the motor 20 (FIG. 1). The end regions 130 made of alloy 625 were hermetically joined to the adapter flange 140 by using a gold braze to form the hermetic sealing assembly 100. Further, the inner and outer surface of the joints 150 and 170 of the sealing assembly 100 could be coated with a metal that is capable of readily forming an oxide, basically to protect the joints 150 and 170 by any kind of corrosion or erosion. The rotor 30 may be operated for example in an environment of approximately 60% $H_2S$ by volume, 30% $CO_2$, with the balance $H_2O$, $N_2$ and hydrocarbons. The environment surrounding the rotor exerts a pressure on the surface 118 of the monolithic ceramic separator 110, which is balanced by oil 72 drawn from an oil tank 70 and disposed on the opposite surface 116 of the monolithic ceramic separator 110.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
    a motor comprising
        a rotor;
        a stator;
        a stator encapsulator; and
        a sealing assembly comprising
            at least one joint, wherein each joint is a chemical bond joint, and
            a monolithic ceramic separator disposed in a gap between the rotor and the stator, the separator comprising a first surface proximate to the stator, and a second surface proximate to the rotor;
        wherein the sealing assembly hermetically isolates the rotor and the stator, and the monolithic ceramic separator is mechanically isolated from the stator;
        wherein the system further comprises a pressure compensation system, the pressure compensation system comprising a tank in fluid communication with the first surface of the separator and disposed to control the difference between a pressure acting on the first surface and pressure acting on the second surface of the separator by disposing a required amount of hydraulic fluid from the tank to act on the first surface.

2. The system of claim 1, wherein the stator is positioned around the rotor.

3. The system of claim 1, wherein the rotor is positioned around the stator.

4. The system of claim 1, wherein the stator and rotor are axially positioned.

5. The system of claim 1, wherein the monolithic ceramic separator comprises an oxide, nitride, or carbide.

6. The system of claim 5, wherein the monolithic ceramic separator comprises zirconium oxide, silicon carbide, silicon nitride, alumina, mullite, titanium nitride, rutile, anatase, boron carbide, boron nitride, beryllium oxide, silica or combinations including any of the foregoing.

7. The system of claim 1, wherein the monolithic ceramic separator comprises a plurality of ceramic sections joined by at least one section joint, wherein the section joint is a chemical bond joint.

8. The system of claim 7, wherein the at least one section joint comprises a diffusion bond.

9. The system of claim 7, wherein the at least one section joint comprises a glass seal.

10. The system of claim 9, wherein the glass seal comprises silicon oxide, boron oxide, bismuth oxide, lead oxide, calcium oxide, sodium oxide, potassium oxide, or combinations including any of the foregoing.

11. The system of claim 7, wherein the at least one section joint comprises a braze alloy.

12. The system of claim 11, wherein the braze alloy comprises gold, copper, silver, platinum, palladium, nickel, titanium, vanadium, zirconium, beryllium, or combinations including any of the foregoing.

13. The system of claim 7, wherein at least one of the ceramic sections further comprises a metal coating disposed on a joining face.

14. The system of claim 1, wherein the sealing assembly further comprises an end region, and wherein the end region is joined to the monolithic ceramic separator by an adapter flange.

15. The system of claim 14, wherein the end region comprises a ceramic material.

16. The system of claim 14, wherein the end region comprises a cermet material.

17. The system of claim 14, wherein the end region comprises a metal.

18. The system of claim 14, wherein the adapter flange comprises a metal.

19. The system of claim 18, wherein the adapter flange comprises gold, nickel, titanium, silver, copper, platinum, palladium, niobium, tantalum, zirconium, molybdenum, alloy 625, cobalt, chromium, stainless steel, or combinations including any of the foregoing.

20. The system of claim 19, wherein the adapter flange comprises niobium.

21. The system of claim 14, wherein the adapter flange is joined to the monolithic ceramic separator by a flange joint, and wherein the flange joint is a braze joint.

22. The system of claim 21, wherein the braze joint comprises a sandwich joint, a butt joint, a lap joint, a cap joint, or combinations including any of the foregoing.

23. The system of claim 22, wherein the braze joint comprises a sandwich joint.

24. The system of claim 22, wherein the braze joint comprises a butt joint and the adapter flange is a metallic flange with cylindrical shape.

25. The system of claim 21, wherein the braze joint comprises a metallic interlayer.

26. The system of claim 25, wherein the metallic interlayer comprises gold, silver, copper, nickel, lead, titanium, niobium, platinum, tantalum, chromium, or combinations including any of the foregoing.

27. The system of claim 14, wherein the monolithic ceramic separator is joined to the adapter flange at a joining surface, and wherein the joining surface of the monolithic ceramic separator comprises a metallization layer.

28. The system of claim 27, wherein the metallization layer comprises molybedenum, molybdenum-maganese, nickel, tungsten, chromium, titanium, copper, boron, niobium, alloy 625, or any combinations of the foregoing.

29. The system of claim 14, wherein the adapter flange and the monolithic ceramic separator are joined at a flange joint, and wherein the system further comprises a coating disposed over the flange joint.

30. The system of claim 29, wherein the coating comprises metal, ceramic, glass, polymer, or any combinations of the foregoing.

31. The system of claim 29, wherein the coating comprises a refractory metal.

32. The system of claim 31, wherein the adapter flange and the end region are joined at an end region joint, and wherein the system further comprises a coating disposed over the end region joint.

33. The system of claim 14, wherein the adapter flange is joined to the end region by an end region joint selected from the group consisting of a direct joint, welded joint, a diffusion bond, a brazed joint, a sintered bond, a cast bond, or any combinations of the foregoing.

34. The system of claim 33, wherein the coating comprises at least one metal.

35. The system of claim 33, wherein the coating comprises at least one ceramic material.

36. The system of claim 33, wherein the coating comprises an oxide.

37. A motor comprising:
a rotor;
a stator;
a stator encapsulator; and
a hermetic sealing assembly comprising a monolithic ceramic separator, a pressure compensation system, and end regions,
wherein the monolithic ceramic separator comprises a first surface proximate to the stator and a second surface proximate to the rotor, and is disposed in a gap between the rotor and the stator, is mechanically isolated from the stator, and is hermetically joined to the end regions by an adapter flange through a butt joint;
wherein the pressure compensation system, the pressure compensation system comprising a tank in fluid communication with the first surface of the separator and disposed to control the difference between a pressure acting on the first surface and pressure acting on the second surface of the separator by disposing a required amount of hydraulic fluid from the tank to act on the first surface; and
wherein the adapter flange has a cylindrical shape and comprises an inner section of alloy 625 and an outer section of molybdenum.

38. A motor comprising:
a rotor;
a stator
a stator encapsulator; and
a hermetic sealing assembly comprising a monolithic ceramic separator disposed in a gap between the rotor and the stator, and a pressure compensation system,
wherein the monolithic ceramic separator comprises a first surface proximate to the stator and a second surface proximate to the rotor, and is mechanically isolated from the stator and comprises a plurality of ceramic sections joined by at least one section joint, wherein each of the section joints is a chemical bond joint, and
wherein the pressure compensation system, the pressure compensation system comprising a tank in fluid communication with the first surface of the separator and disposed to control the difference between a pressure acting on the first surface and pressure acting on the second surface of the separator by disposing a required amount of hydraulic fluid from the tank to act on the first surface.

39. A motor comprising:
a rotor;
a stator;
a stator encapsulator; and
a hermetic sealing assembly comprising a monolithic ceramic separator, a pressure compensation system, and end regions, wherein the monolithic ceramic separator comprises a first surface proximate to the stator, and a second surface proximate to the rotor, is disposed in a gap between the rotor and the stator, is mechanically isolated from the stator, and is hermetically joined to the end regions by an adapter flange;
wherein the adapter flange is joined to the monolithic ceramic separator and the end regions by means of chemical bond joints; and
wherein the pressure compensation system, the pressure compensation system comprising a tank in fluid communication with the first surface of the separator and disposed to control the difference between a pressure acting on the first surface and pressure acting on the second surface of the separator by disposing a required amount of hydraulic fluid from the tank to act on the first surface.

* * * * *